(12) United States Patent
Hammerich et al.

(10) Patent No.: US 9,121,639 B2
(45) Date of Patent: Sep. 1, 2015

(54) CLINKER KILN WITH SLIDER FOR TERTIARY AIR DUCT

(75) Inventors: Jörg Hammerich, Neustadt (DE); Robert Mathai, Neustadt (DE)

(73) Assignee: IKN GMBH Ingenieurburo-Kuhlerbau-Neustadt (DE)

(*) Notice: Subject to any disclaimer, the term of this patent is extended or adjusted under 35 U.S.C. 154(b) by 406 days.

(21) Appl. No.: 13/568,731

(22) Filed: Aug. 7, 2012

(65) Prior Publication Data

US 2013/0203005 A1 Aug. 8, 2013

(30) Foreign Application Priority Data

Aug. 24, 2011 (DE) .................. 10 2011 052 963

(51) Int. Cl.

| | |
|---|---|
| F27D 15/02 | (2006.01) |
| F27B 7/42 | (2006.01) |
| F16K 3/02 | (2006.01) |
| F27B 7/20 | (2006.01) |
| F27D 17/00 | (2006.01) |
| F27D 99/00 | (2010.01) |
| F27D 9/00 | (2006.01) |
| F23L 13/06 | (2006.01) |

(52) U.S. Cl.
CPC . *F27B 7/42* (2013.01); *F16K 3/029* (2013.01); *F23L 13/06* (2013.01); *F27B 7/20* (2013.01); *F27D 9/00* (2013.01); *F27D 17/00* (2013.01); *F27D 17/004* (2013.01); *F27D 99/0073* (2013.01)

(58) Field of Classification Search
USPC ............. 432/15, 58, 64, 77; 251/326; 138/37, 138/40, 45, 46
See application file for complete search history.

(56) References Cited

U.S. PATENT DOCUMENTS

| | | | | |
|---|---|---|---|---|
| 2,494,634 | A | * | 1/1950 | Schmidt .................. 137/340 |
| 4,176,673 | A | * | 12/1979 | Connor ................... 137/240 |
| 4,275,763 | A | | 6/1981 | Fahrig |
| 4,598,732 | A | * | 7/1986 | Seeger et al. ............ 137/334 |
| 4,612,955 | A | | 9/1986 | Purvis |
| 8,137,100 | B2 | * | 3/2012 | Schurmann et al. ......... 432/14 |
| 8,905,753 | B2 | * | 12/2014 | Gasser .................... 432/16 |
| 2003/0143508 | A1 | * | 7/2003 | Ramesohl et al. .......... 432/58 |
| 2009/0095932 | A1 | * | 4/2009 | Leblanc et al. ........... 251/326 |
| 2010/0199893 | A1 | * | 8/2010 | Gasser ................ 110/101 CF |

FOREIGN PATENT DOCUMENTS

| | | |
|---|---|---|
| CN | 1042409 A | 3/1999 |
| CN | 201819820 U | 5/2011 |
| DE | 2744268 C2 | 6/1978 |
| DE | 29924941 U1 | 3/2007 |
| EP | 0937957 A2 | 8/1999 |

* cited by examiner

*Primary Examiner* — Gregory A Wilson

(74) *Attorney, Agent, or Firm* — Yakov Sidorin; Quarles & Brady LLP

(57) ABSTRACT

A slider unit for a tertiary air duct between a clinker cooler and a calciner of a clinker kiln line. The slider unit has at least one shutoff device, which is insertable into a tertiary air duct to seal it without further reducing the cross section of the tertiary air duct, and provides reliable sealing of the tertiary air duct and control of the tertiary air flow, if the slider unit has at least one control device which is insertable into a section of the tertiary air duct to reduce its cross section.

12 Claims, 5 Drawing Sheets

CLINKER KILN WITH SLIDER FOR TERTIARY AIR DUCT

CROSS-REFERENCE TO RELATED APPLICATIONS

This application claims benefit of and priority from the co-assigned German Application No. 10 2011 052 963.2 filed on Aug. 24, 2011. The disclosure of the above-mentioned Patent Application is incorporated herein by reference in its entirety.

TECHNICAL FIELD

The present invention relates to a slider unit for a tertiary air duct between a clinker cooler and a calciner of a clinker kiln plant.

RELATED ART

Cement clinker, also referred to herein as clinker, is usually produced in a rotary kiln. The clinker is discharged from the hot end of the rotary kiln onto a cooling grate of a clinker cooler. Resting on top of the cooling grate, the clinker is cooled by a gas or a mixture of gases, usually air. As a result, the air is strongly heated, at least in the area close to the kiln. This strongly heated air has a temperature of approximately 750-1300° C. and is highly dust-laden. The heated air is extracted from the clinker cooler at the kiln hood and/or the cooler roof and is dissipated through a so-called tertiary air duct. Accordingly, such air is referred to as tertiary air. This tertiary air is normally used for pre-processing of the raw meal and mostly fed to a calciner or an upstream combustion or gasification unit, such as a combustion chamber, for example. The term calciner is used in this application as a synonym for a "raw meal preprocessing unit" being fed with tertiary air as a source of heat and/or oxygen.

The raw materials necessary for the production of cement clinker are at least partly decarbonised in the calciner, using the thermal energy contained in the tertiary air directly, whereas the oxygen contained in the tertiary air is used for the combustion of the fuel in the secondary firing. The permanent optimisation of energy efficiency in cement producing plants results in an increase of tertiary air temperature. At the same time, the tertiary air volume per time unit decreases. The increasing use of secondary fuels, coal with high ash content, petrol coke and the like particularly increases the dust contingent, i.e. the dust load in the tertiary air. In order to prevent clinker dust from clogging the tertiary air duct in the long term, the flow speed inside the tertiary air duct is increased. The higher temperature and the high dust load, in combination with the higher flow speed, cause higher wear on the refractory lining inside the tertiary air duct.

When the clinker kiln line is started up, the tertiary air duct has to be initially closed. So called shutoff devices are used for this purpose. In the simplest case, these are plate-like sliders, which are inserted into the tertiary air duct orthogonally to the flow direction, thus closing the duct during start-up of the clinker kiln line. Foldable flaps are used as shutoff devices as well. After the start-up (or "ramp up") the shutoff devices should be completely open. The present invention is based on the realization that the shutoff devices are, beyond their design, often used to control the amount of tertiary air per time unit, for example when the clinker kiln line is not operated at full production. In this case the shutoff devices are only inserted partly into the tertiary air duct, for example to split up the supply air for the combustion in the kiln and the calciner, thus ensuring oxidizing conditions at the kiln inlet.

When the shutoff devices do not close the tertiary air duct completely, they are subject to strong wear as the clinker dust contained in the tertiary air is highly abrasive. As a result, the shutoff element is abraded and thereby shortened to the extent that it cannot reliably seal the tertiary air duct. A normal restart of the clinker kiln line after an unscheduled shutdown is not possible without exchanging the shutoff device.

Another persisting problem is the deformation of the shutoff element caused by thermal stress, which can result in jamming of the shutoff device such that the adjustment of the same becomes impossible.

SUMMARY OF THE INVENTION

Embodiments of the present invention are directed to facilitate a reliable shutting-off of a tertiary air duct and control of the tertiary air flow.

This task is solved by a slider configured to be inserted into a tertiary air duct.

In particular, an embodiment of the slider unit can be inserted into a tertiary air duct of a clinker kiln line, hence it is located in the tertiary air flow between a clinker cooler and a calciner of the clinker kiln line. Accordingly, the slider unit can have a duct section, which can be inserted into the tertiary air duct. A preferably plate-like shut-off device can be inserted into the tertiary air duct in order to shut off the tertiary air duct, in other words close it completely. In addition to the shutoff device, the slider unit contains at least one control device that is insertable into the tertiary air duct in order to reduce the cross section of the duct. The slider unit is adapted to ensure that shutoff and control functionalities are separated. Therefore, the shutoff device is not subject to noteworthy wear, as it is only inserted into the tertiary air duct to close it completely. Hence its functioning is ensured permanently. The control device, however, can be inserted into the tertiary air duct in order to reduce its cross section and, when so inserted, is exposed to the tertiary air flow and should be designed accordingly. Preferably, the control device is at least on the side facing towards the tertiary air flow equipped with a heat resistant cladding of refractory bricks or similar material. Refractory here is not only stone-like, heat resistant material with 10 to 45 per cent alumina content but, according to the general linguistic usage, all heat resistant, in particular stone-like claddings, in particular claddings made of ceramics or ceramic elements. For simplification reasons there is no differentiation in the following text between air, a gas or a mixture of gases used as cooling agent for the clinker. The terms air or tertiary air are consequently not limited to the typical gaseous composition of air.

Preferably, the control device is supported by the shutoff device on its downwind side, that is the side facing away from the tertiary air flow. Therefore, the slider unit is particularly small. In one embodiment, the control device is located upwind, that is the side facing towards the tertiary air flow, of its guide. Hence, the guide is covered and therefore shielded against the tertiary air flow by the control device.

Preferably, the length of the control device is significantly less than the diameter of the duct section, as it does not have to shut off the tertiary air duct. To cover the usual control range a length of about ⅓ to about ⅔ of the duct diameter is sufficient. Consequently, it requires only a small amount of space next to the tertiary air duct when withdrawn completely from the tertiary air duct. In addition it takes less refractory material to protect the smaller slider, which reduces costs.

Preferably, the shutoff device has at least two parallel movable shutoff segments. In one embodiment, the length of each of the two shutoff segments is less than or equal to the length of the control device to ensure that the space required for the slider unit next to the tertiary air duct can be kept particularly small. For example, the shutoff device can have at least two plates, movable in parallel to each other, which can be inserted into the duct section.

It is preferred that at least a first shutoff segment is movable in a guidance of at least another shutoff segment. Therefore, the guidance of the first shutoff segment is not exposed to the tertiary air flow when the shutoff device is open and thus protected from damage through the tertiary air.

It is preferred that at least the first shutoff segment of a multi-segment shutoff device has at least one catch element for another shutoff segment of the shutoff device. Thus it is sufficient to actuate the first shutoff segment to open or close the tertiary air duct.

It is preferred that the shutoff device and the control device are mounted suspended above the tertiary air duct and can be lowered into the tertiary air duct. Therefore no thrust needs to be applied to close the shutoff device or to insert the control device. Flexible connecting elements such as chains or belts, for example, can be used instead of push rods, which further reduces the space required for the slider unit.

Preferably, the control device includes at least one carrier, which relates to a method of adjustment of the control device. For example, the at least one carrier may be suspended from at least one chain hoist. The carrier is preferably clad with refractory bricks, optionally with an isolating layer (such as, for example, insulating wool) that is located between the carrier and the refractory bricks. Preferably, the bricks can be bolted to the carrier, thereby securing the isolating layer. Such implementation of a control device has a good price/lifetime ratio.

Preferably the control device and/or the shutoff device has at least one channel adapted to contain a cooling agent. This further improves durability of the device.

The duct section of the tertiary air duct, in which the control device and/or the shutoff device are to be inserted, has preferably at least one slot adapted to accommodate the control device and/or the shutoff device therethrough. The duct section has preferably lateral guides, in the direction of movement, in which the shutoff device and/or the control device are movable.

BRIEF DESCRIPTION OF THE DRAWINGS

In the following, the invention will be described by way of examples, without limitation of the general inventive concept, of embodiments and with reference to the drawings.

Figure 1:
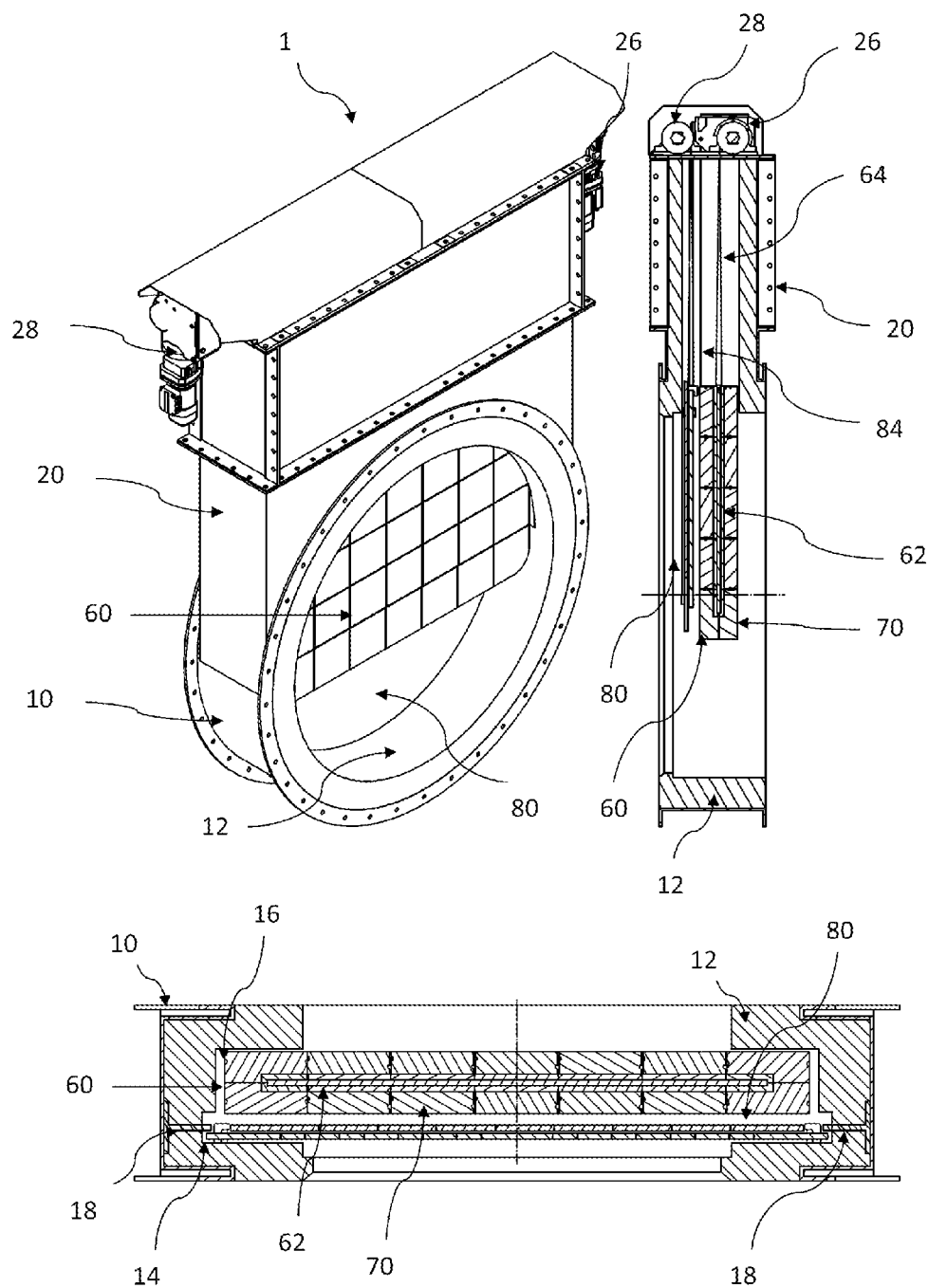
FIG. 1 provides several views of a slider unit for a tertiary air duct according to an embodiment of the invention.

Various modifications and alternative forms of an embodiment of the invention are within the scope of the invention. The specific embodiments are shown by way of example in the drawings and will herein be described in detail.

It should be understood, however, that the drawings and related description are not intended to limit the invention to the particular form disclosed, but to the contrary, the intention is to cover all modifications, equivalents and alternatives falling within the spirit and scope of the present invention as defined by the appended claims.

DETAILED DESCRIPTION

The slider unit 1 in FIG. 1 has a duct section 10, configured to be installable in a tertiary air duct and is clad with refractory material 12. Hence, the slider unit can be installed in a tertiary air duct as a module, which makes the assembly easier. A box-like carrier 20 with enough space to accommodate a control device 60 (shown inserted into the tertiary air duct) and a shutoff device 80 (shown partly inserted) is located on top of the duct section 10. On the upper side of the carrier 20 drives 26, 28 are located to withdraw the control device 60 or the shutoff device 80, respectively, from the duct section 10 into the carrier 20 to open the tertiary air duct completely or to insert the shutoff device and the control device into the duct section 10 independently (see FIG. 2). To guide the control device 60 and the shutoff device 80 grooves 14, 16 as guides are foreseen, in which the two devices 60, 80 are movable (see FIG. 1). Additionally, the shutoff device is guided by the guides 18 on both sides. Simply speaking the guides include rails that extend to the inside through a slot in the refractory cladding of the carrier 20.

The shutoff device 80 includes two shutoff segments that move parallel to each other, the example shown here is plate-shaped, further referred to as plates 82, 83. Plate 82 is located in front of plate 83 in a guide of the rear plate 83 (see FIG. 3). The front plate 82 has a lower edge 86 or lower narrow side 86 that is adapted to the contour of the lower part of the duct section 10. Fastenings 84 holding the front plate 82 are attached on its upper narrow side 88. This upper narrow side 88 is at least approximately horizontal. The lateral narrow sides 92 are at least approximately parallel to each other and have a vertical longitudinal axis. The rear plate 83 hangs on the upper narrow side of the front plate 82. For this purpose the rear plate 83 is equipped with angle profiles 85 on its front side used as catch elements 85, the free ends of which are angled downward at least approximately parallel to the front plate 82. These catch elements 85 bear on the upper narrow side 88 of the front plate 82.

In order to close the duct section 20, the front plate 82 together with the rear plate 83 is lowered from the carrier 20 into the tertiary air duct until the rear plate 83 is located in the groove 16 and at least the lower part of the lateral narrow sides 93 bears on the groove. Consequently, the shapes of the lower part of the narrow sides 93 are adapted to the contour of the duct section 10. When the rear plate 83 bears on the inner wall of the duct section 10, the front plate 82 slides further downwards, being guided by the angle profiles 85 attached to the rear plate 83. In its final position, the front plate also bears on the groove 16. The duct section 10 is now sealed for tertiary air. To open the tertiary air duct the front plate 82 can be lifted upwards via the fastenings 84. During such lifting, it is guided by the groove 16 in the wall of the duct section 10 as well as the lateral angle profiles 85. Approximately halfway up, the front plate 82 attaches to the rear plate 83 or the upper angle profiles respectively from below and also lifts the rear plate, until both plates have reached their final position inside the carrier. The duct section 10 is now open (not shown). As both plates 82, 83 are guided parallel to each other in a telescope-like manner, the minimum construction height of the carrier is significantly reduced. Therefore such a shutoff device 80 can be retrofitted even with reduced available space.

Figure 4:
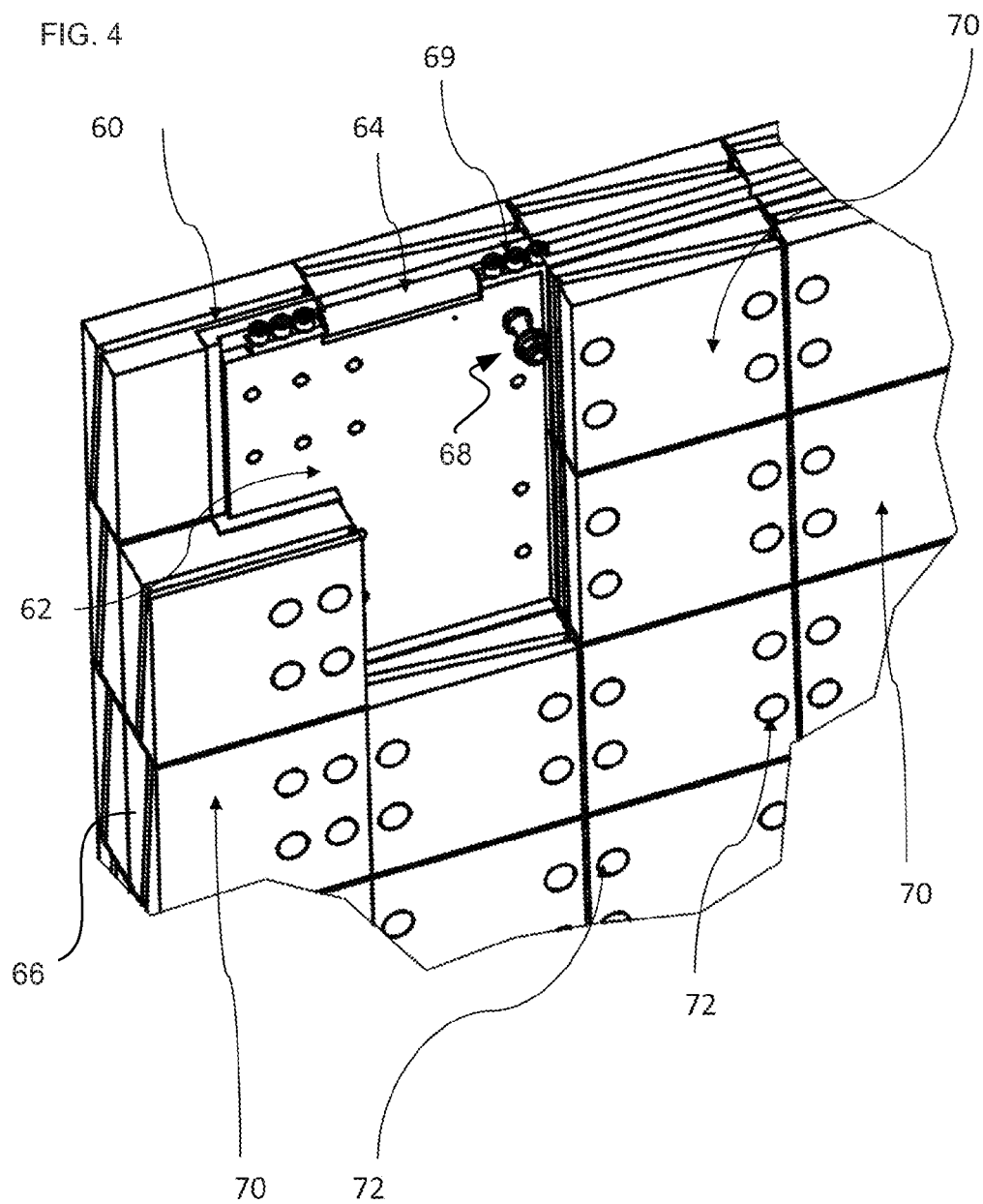
FIG. 4 is a perspective view of another detail of a slider unit of FIG. 2.

The control device 60 has a carrier plate 62 having fastening elements 64 attached to its upper end. The carrier plate 62 is suspended from the fastening elements 64 (see FIG. 4). Heat resistant isolating material 66, for example mineral wool felt, is attached to the front and rear sides of the carrier plate 62 as well as to the narrow sides (at least the two lateral and the lower narrow side). The isolating material 66 is clad with refractory bricks 70. The refractory bricks are bolted to the carrier plate 62 by bolts 68. The refractory bricks 70 have through holes 72, which have a larger diameter on the side facing away from the carrier plate 62. The larger sections of the through holes 72 are used to receive nuts 69, thus protecting the nuts and the projecting parts of the bolts 68 from abrasion by clinker dust. Preferably, the holes are sealed by a curing heat resistant matter.

Figure 2:
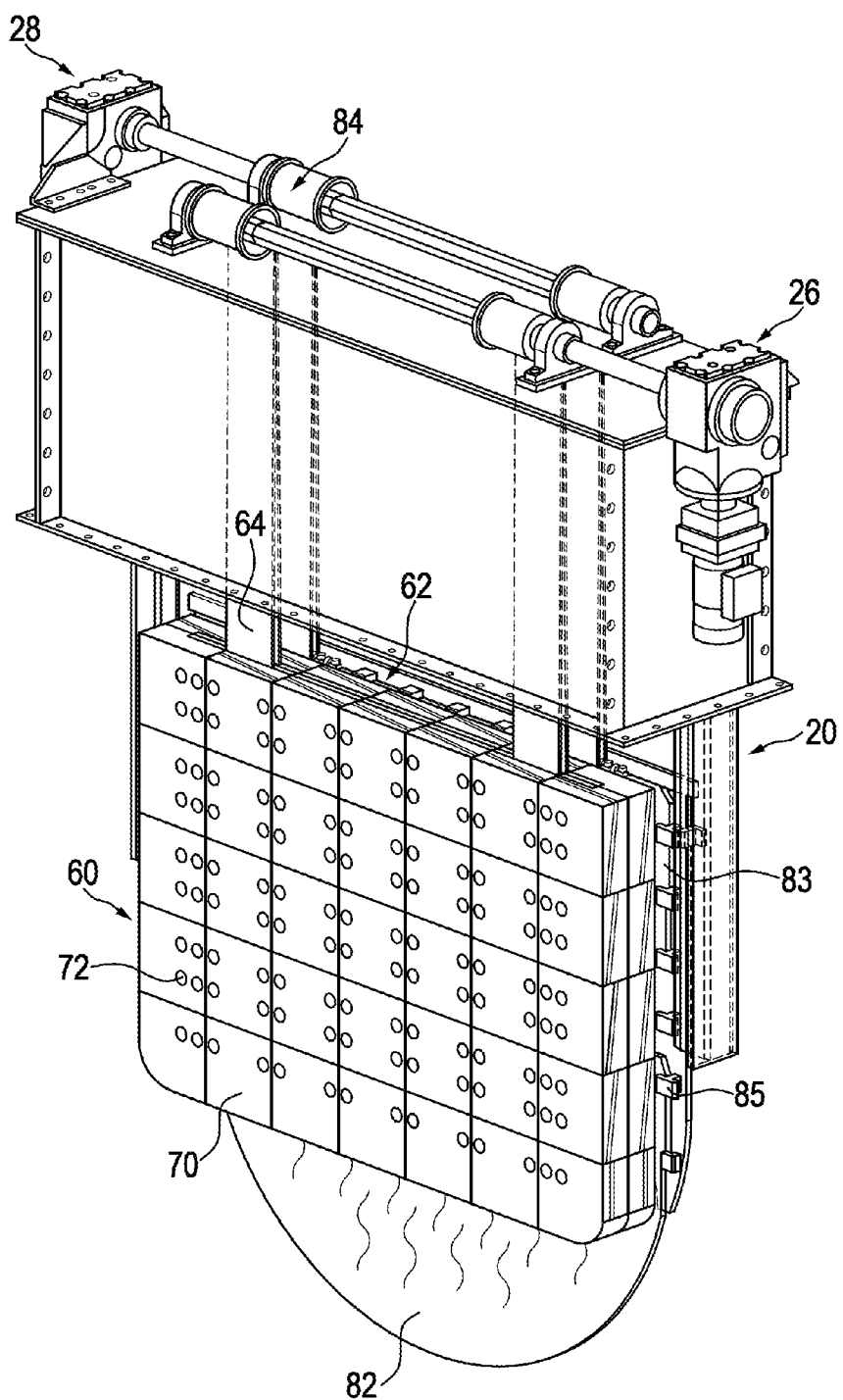
FIG. 2 is a perspective view of a partly assembled slider unit according to an embodiment of the invention.
Figure 3:
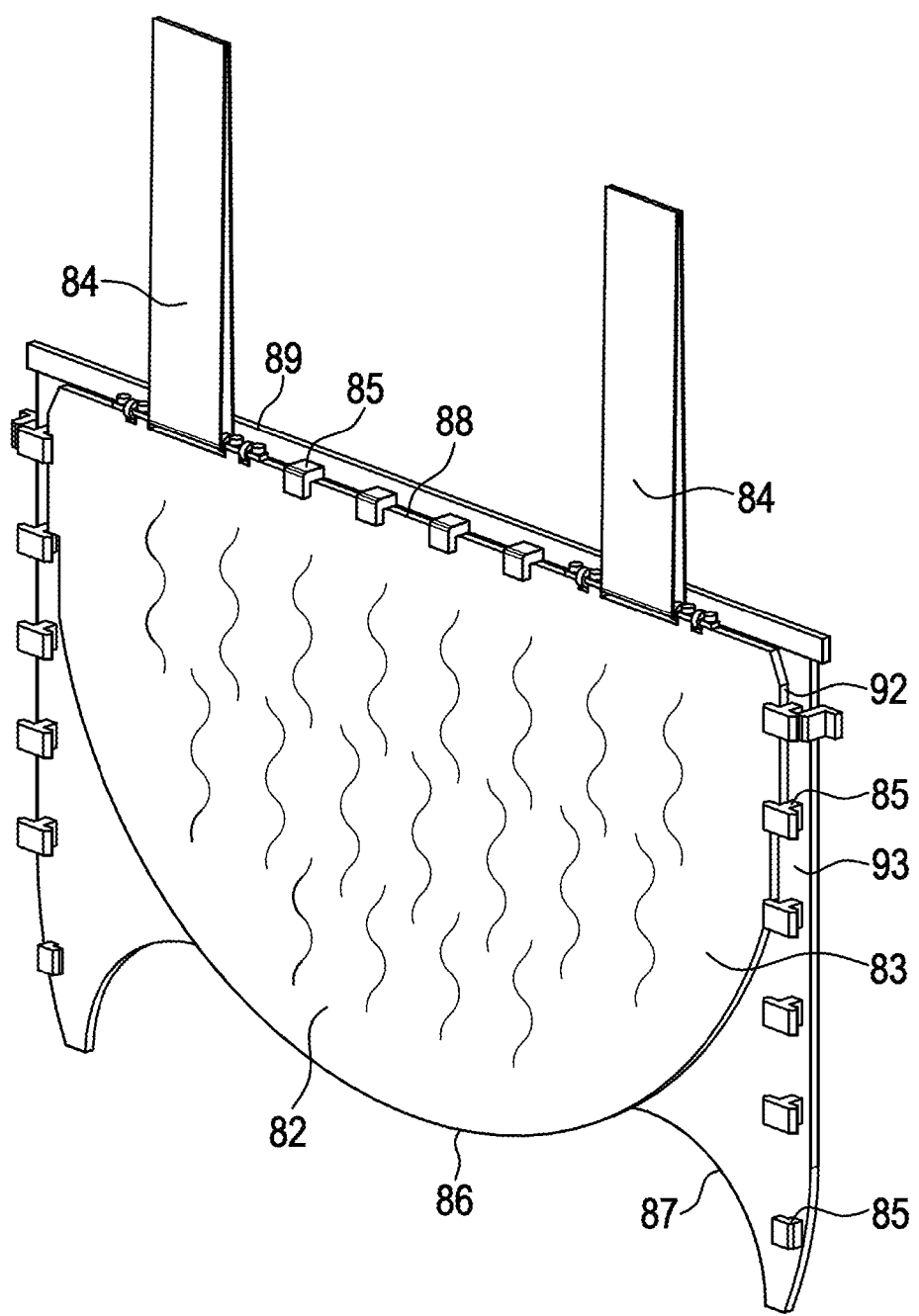
FIG. 3 is a perspective view of a detail of a slider unit of FIG. 2.
Figure 5:
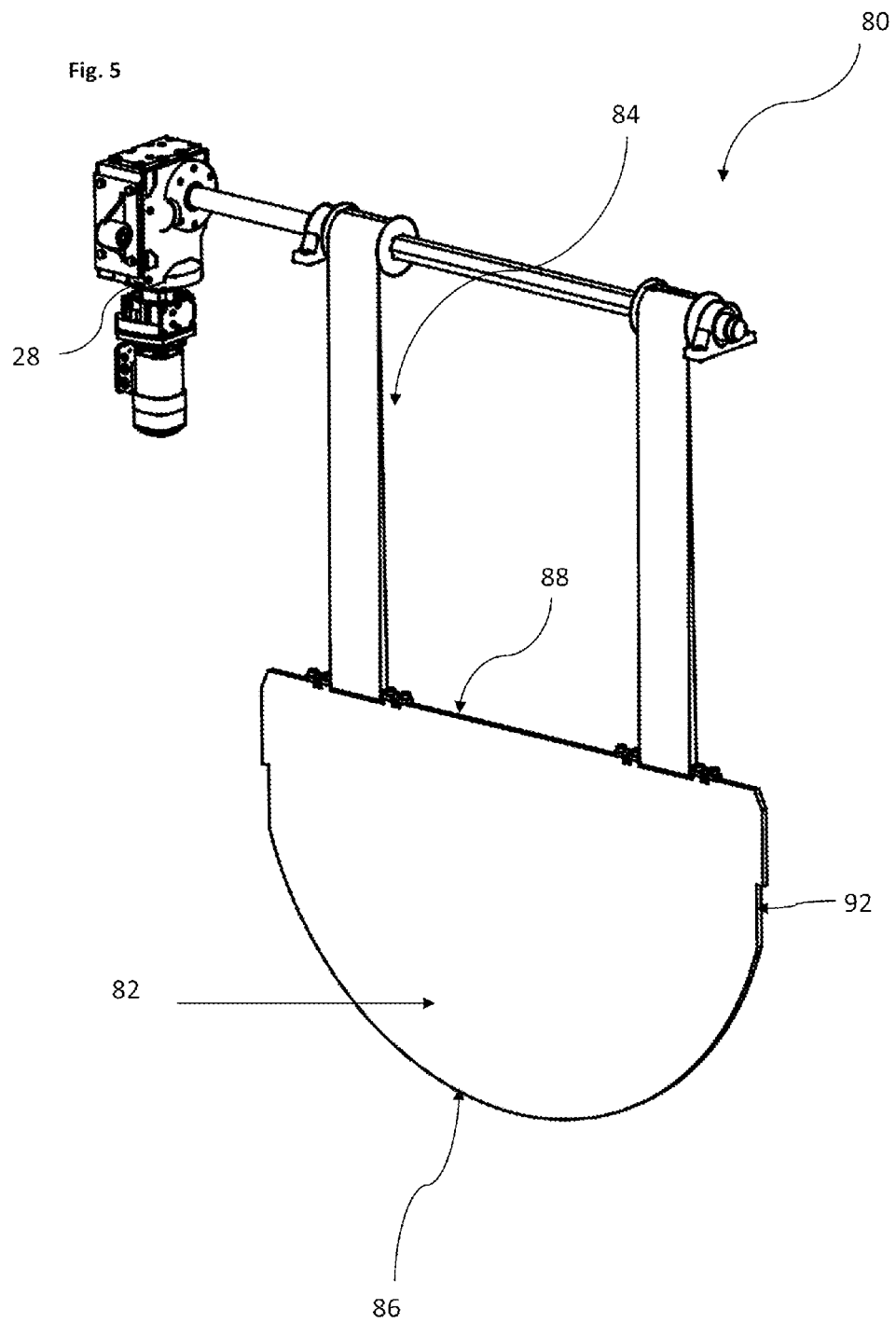
FIG. 5 is a perspective view of a detail of an alternative embodiment of a shutoff device.

Unlike the shutoff device 80 shown in FIGS. 1 to 3, the shutoff device 80 depicted in FIG. 5 consists of only one plate 82, which hangs from fastening elements 84 and can be lifted out of or lowered into a duct section 10 by a drive 28. The shutoff device 80 has only one plate, which cannot cover the complete cross section of the tertiary air duct, but the plate is lowered behind the control device, so that it is sufficient to seal the remaining open part of the tertiary air duct below the control device with the single plate.

It will be appreciated to those skilled in the art having the benefit of this disclosure that embodiments of this invention are believed to provide a slider unit for a tertiary air duct of a cement clinker line. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 slider unit
10 duct section
12 heat resistant material/cladding (i.e. refractory or ceramics)
14 groove
16 groove
18 guide
20 carrier
26 drive
28 drive
60 control device
62 carrier plate
64 fastening element
66 isolating material
68 bolt
69 nut
70 refractory bricks/heat resistant cladding
72 through hole
80 shutoff device
82 plate/shutoff segment
83 plate/shutoff segment
84 fastening element
85 catch/angle profile
86 lower edge/lower narrow side of the front plate
87 lower edge/lower narrow side of the rear plate
88 upper narrow side of the front plate
89 upper narrow side of the rear plate
92 lateral narrow sides of the front plate
93 lateral narrow sides of the rear plate

What is claimed is:

1. A slider unit for a tertiary air duct and configured to be disposed in cooperation with a duct section between a clinker cooler and a calciner of a clinker kiln line, the slider unit having
at least one control device having a carrier plate that is dimensioned to be removably inserted along a direction into and across said tertiary air duct to reduce an air-flow in the tertiary air duct, and
a shutoff device having at least one shutoff-device plate that is dimensioned to be removably inserted along the direction into and across said tertiary air duct in parallel and immediately adjacently to said carrier plate to block a portion of the tertiary air duct that is left open for the air-flow by the control device and to seal said tertiary air duct completely.

2. The slider unit of claim 1,
wherein said control-device plate of the at least one control device is disposed next to a first side of said at least one shut-off device plate, said first side facing the clinker cooler when the slider unit is disposed in cooperation with the duct section.

3. The slider unit of claim 2, wherein the at least one control device is supported by the shutoff device on a second side of the at least one control device.

4. The slider unit of claim 1, wherein the shutoff device has first and second shutoff-device plates disposed and moveable, respectively, in first and second planes, the first and second planes being different planes parallel to one another.

5. The slider unit of claim 4,
further comprising an angle-profile unit attached to at least one of the first and second shutoff-device plate, said angle-profile unit configured as a guide for movement of another of the first and second shutoff-device plates in and out of the duct section.

6. The slider unit of claim 4, wherein at least one of the first and second shutoff-device plates has at least one catch element attached at a peripheral side of said at least one of the first and second shutoff-device plates, said catch element configured to limit a movement of another of the first and second shutoff-device plates along the direction.

7. The slider unit of claim 1, further comprising a heat resistant cladding attached to said carrier plate.

8. The slider unit of claim 1, wherein the control device has a self-supporting plate of heat resistant material.

9. The slider unit of claim 1, wherein a surface of the control device which, when the slider unit is disposed in cooperation with the duct section, faces the calciner is smaller than a cross section of the tertiary air duct.

10. An installation system for producing cement clinker, the system comprising a kiln, a calciner, a clinker cooler, and a tertiary air duct operably connecting said calciner and clinker cooler and adapted to convey pre-heated air to the calciner; wherein the installation system has at least one slider unit according to claim 1.

11. The slider unit of claim 1, further comprising
a carrier box having an inner volume dimensioned to enclose said at least one control device and said at least one shutoff-device plate in a spatial orientation in which, the carrier plate and the at least one shutoff-device plate are parallel to one another, and first and second drive units cooperated with an outer side of said carrier box and configured to move, respectively and independently from one another, the at least one shutoff-device plate and the carrier plate across the tertiary air duct.

12. The slider unit of claim 1, wherein the shutoff device has first and second shutoff-device plates disposed, respectively, in first and second planes that are different from one another and parallel to one another, and wherein a cross-section of each of said first and second shutoff-device plates is smaller than a cross-section of the tertiary air duct.

\* \* \* \* \*